No. 761,717. PATENTED JUNE 7, 1904.
A. ROSENTHAL.
BAND CUTTER AND FEEDER FOR CORN HUSKING MACHINES.
APPLICATION FILED FEB. 2, 1903.
NO MODEL.
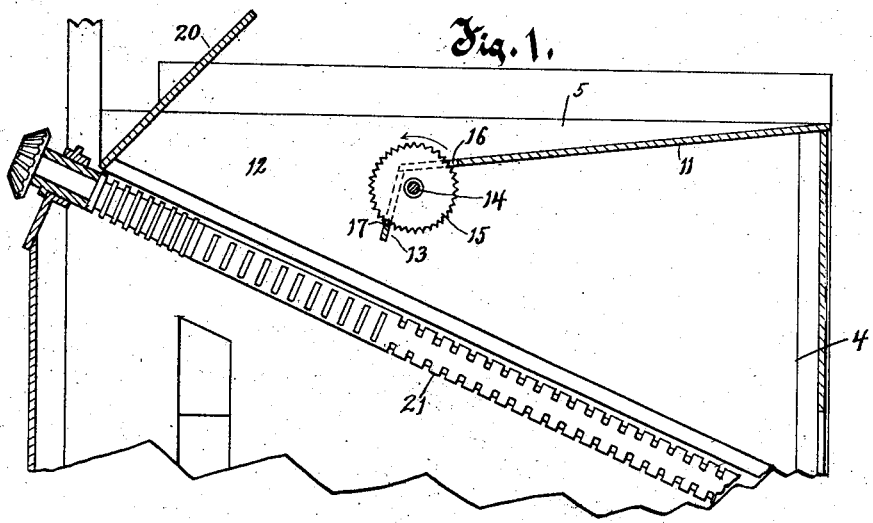
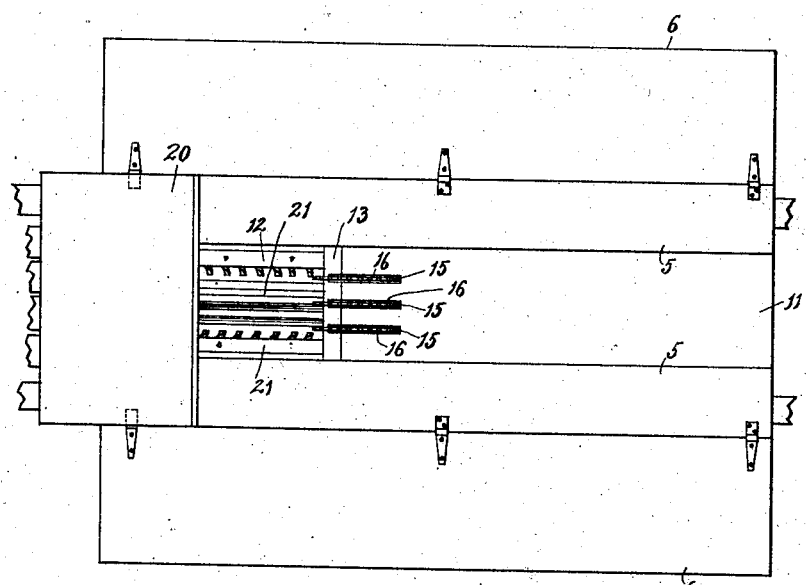
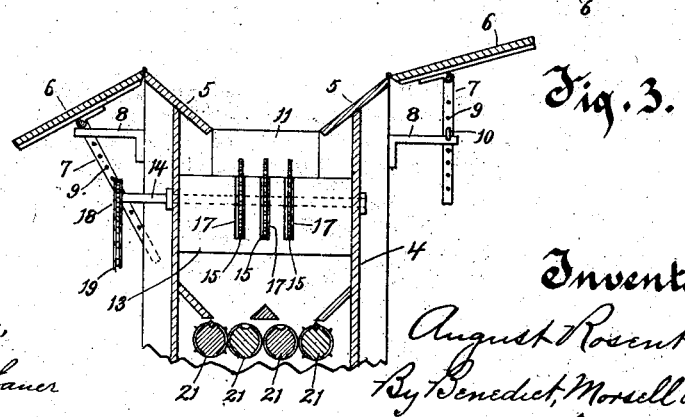
Witnesses.
O. H. Keeney,
Anna F. Schmidtbauer
Inventor.
August Rosenthal
By Benedict, Morsell & Green.
Attorneys.

No. 761,717. Patented June 7, 1904.

UNITED STATES PATENT OFFICE.

AUGUST ROSENTHAL, OF WEST ALLIS, WISCONSIN, ASSIGNOR TO ROSENTHAL CORN HUSKER COMPANY.

BAND-CUTTER AND FEEDER FOR CORN-HUSKING MACHINES.

SPECIFICATION forming part of Letters Patent No. 761,717, dated June 7, 1904.

Application filed February 2, 1903. Serial No. 141,430. (No model.)

*To all whom it may concern:*

Be it known that I, AUGUST ROSENTHAL, residing at West Allis, in the county of Milwaukee and State of Wisconsin, have invented a new and useful Improvement in Band-Cutters and Feeders for Corn-Husking Machines, of which the following is a description, reference being had to the accompanying drawings, which are a part of this specification.
My invention has relation to band-cutters and feeders for corn-husking machines.

It relates to that class of corn-husking machines in which the bundles of tied cornstalks are deposited in a hopper in the upper portion of the machine and then passed through an opening or passage in the bottom of the hopper onto separating and husking rolls extending lengthwise of the machine, and which rolls receive the cornstalks therebetween and separate the ears from the stalks and permit said ears to travel along the rolls and to be husked while the stalks passing between the rolls are carried to the cutting and shredding mechanism.
One of the primary objects of the invention is to interpose in the passage from the hopper to the rolls band cutting or severing mechanism located at the inner end of the passage and at which point the cutting mechanism is best adapted to effect the severing operation and also effect the separation of the entangled stalks one from the other after the bands are cut.

A further object resides in an improved construction of the hopper or feeding device.

With the above and other incidental objects in view the invention consists of the devices and parts or their equivalents, as herein more fully set forth.
In the accompanying drawings, Figure 1 is a longitudinal sectional view of so much of a corn-husking machine as is necessary to illustrate my invention. Fig. 2 is a plan view of Fig. 1, and Fig. 3 is a transverse section of Fig. 2.

Referring to the drawings, the numeral 4 indicates a fragment of the frame of the machine, within which are contained the principal parts of the operating mechanism.

The top of the frame is open and is made in hopper-like form by the provision of inwardly-inclined boards 5 5, secured to the top edges of the opposite side pieces of the frame. Hinged to the outer edges of these boards are wings 6 6. Depending from and hinged to the under side of these wings are bars 7 7. Each bar passes freely through an eye at the outer end of a bracket 8, and each bar is provided with a series of perforations 9, through any of which a pin 10 may be passed, and which pin is adapted to rest on top of the horizontal arm of the bracket, and thereby hold the wing at adjusted position. In Fig. 3 of the drawings one of the wings is shown raised to a considerable extent and the other wing lowered to its full extent. One of the objects of the wings is to act as protectors for the gearing or other parts therebeneath and adjacent to the outside of the side pieces of the frame 4, serving to prevent the cornstalks when carelessly deposited in the hopper from falling down outside of the frame and becoming entangled with the gearing or other parts beneath the wings. It frequently happens that the machine is so positioned that it is more convenient to feed cornstalks to the hopper entirely from one side of the machine. It is for this reason that I provide for the adjustability of the wings. When it is desired to feed cornstalks in the manner referred to, the wing on the side of the machine from which the feeding is being done is lowered to the required extent to permit the cornstalks to freely enter the hopper, while the opposite wing is raised considerably, so as to provide a guard to prevent the cornstalks which are thrown into the hopper from escaping over the side of the machine.

The hopper is provided with a bottom piece 11, which extends from the rear end of the machine, forwardly at a declination. It terminates short of the forward end of the machine, so as to leave an opening or passage 12 of considerable width. At the front edge of the bottom piece 11 and projecting downwardly for a short distance and extending across the frame 4 is a transverse board 13, which acts as a guard to prevent the cornstalks from passing in the first place directly beneath the bottom of the hopper and on the husking portions of the rollers hereinafter referred to.

Immediately below the front edge of the bottom piece 11, so as to be located at the inner end of the passage 12, and journaled in the side pieces of the frame 4 is a transverse shaft 14. On this shaft is mounted the band-cutting mechanism. This cutting mechanism may be a single cutter; but preferably a plurality of cutters, advisably three, although any other number may be provided, are disposed at desired distances apart on the shaft. Each cutting mechanism may also be of any desired form adapted for effecting the severing of the band. I prefer, however, that each should be in the form of a circular saw, (indicated by the numeral 15, and as clearly indicated in the drawings. As will be seen from the drawings, both the bottom piece and the transverse board 13 are slitted, so as not to interfere with the free rotation of the saws. The slits in the bottom piece are indicated by the numerals 16, and the slits in the transverse board are indicated by the numerals 17. The shaft 14 may be rotated by any desirable means, so long as the cutting mechanism thereon is rotated in a direction toward the front end of the machine, as indicated by the arrow in Fig. 1. In the drawings I show for the purpose a sprocket-wheel 18 on the end of the shaft and a sprocket-chain 19 passing around said wheel and adapted to be led to and driven by any rotatable portion (not shown) of the mechanism of the machine.

At the outer end of the passage or opening 12 is a guard-board 20, which is arranged on a gradual inclination inwardly.

Arranged longitudinally in the frame and at a desired distance below the band-severing mechanism and extending from the front end of the frame rearwardly at a declination are a series of separating and husking rollers 21. As these rollers are of a form of construction covered in patents heretofore issued to me and are rotated in a similar manner, no explanation thereof is deemed necessary.

In the operation of the invention tied bundles of cornstalks are fed into the hopper with the ears of the cornstalks pointing toward the rear of the machine. The rotation of the cutting mechanism will effect the severing of the bands or cords of the bundles, and at the same time said cutting mechanism will serve to separate the entangled stalks from each other, this being particularly true where a plurality of cutting mechanisms are provided, and also still more effectually will this be accomplished where cutting mechanisms of the particular form shown—viz., circular saws—are employed. Furthermore, the particular location of the cutting mechanism—viz., at the inner end of the opening or passage 12—is such as to insure the effective cutting of the bands and the disentanglement of the stalks after the bands are severed, so that said stalks are permitted to arrange themselves singly on the longitudinal husking-rolls therebeneath, and being so arranged thereon can be acted upon most effectively by said rolls. Not only is the cutting mechanism located at the inner end of the opening or passage 12, so as to provide for the most effective cutting and disentangling operations, but it will also be observed that it is located above the husking-rolls, so as to insure the cutting of the bands and the disentanglement of the stalks before said stalks reach the husking-rolls. The inclined board 20 at the outer end of the passage 12 serves as a guard to prevent the stalks from working out of the front end of the machine, and, furthermore, serves to crowd or thrust the stalks downwardly through the passage or opening 12 with the ears of corn uppermost, so that the ends of the stalks will be grasped by the husking-rolls and carried therebeneath and therebetween and the ears snapped off the stalks and permitted to slide down the inclined husking-rollers. This operation is also aided by the cutting mechanism, inasmuch as said mechanisms are rotated toward the board, and hence assists in forcing the cornstalks downwardly in the manner described.

What I claim as my invention is—

1. The combination of a frame, rotatable husking-rolls arranged therein and extending from the front toward the rear of the machine and adapted to grasp the ends of the cornstalks and pull said stalks therebeneath and snap the ears from the stalks, a hopper in the upper portion of the frame, the bottom of said hopper provided with an opening forming a passage leading to the husking-rolls, band-severing mechanism located at the inner end of the passage and above the husking-rolls, and means for rotating said band-severing mechanism in a direction toward the outer end of the passage, said band-severing means having its downwardly-moving edge projecting into the passage.

2. The combination of a frame, rotatable husking-rolls arranged therein and extending from the front toward the rear of the machine, and adapted to grasp and carry the ends of the cornstalks therebetween, and snap the ears from the stalks, a hopper in the upper portion of the frame, the bottom of said hopper provided with an opening forming a passage leading to the husking-rolls, a plurality of alined band-severing mechanisms rotatable together and located at the inner end of the passage and above the husking-rolls, and means for rotating said band-severing mechanisms in a direction toward the outer end of the passage.

3. The combination of a frame, rotatable husking-rolls arranged therein and extending from the front toward the rear of the machine, and adapted to grasp and carry the cornstalks therebetween and snap the ears from said stalks, a hopper in the upper portion of the frame, the bottom of said hopper provided with an opening forming a passage leading to the husking-rolls, band-severing mechanism located at the inner ends of the passage and above the husking-rolls, an inwardly-inclined board at the outer end of the passage, and means for rotating the band-severing mechanism in a direction toward the board.

4. The combination of a frame, rotatable husking-rolls arranged therein and extending from the front toward the rear of the machine, and adapted to grasp and carry the cornstalks therebetween and snap the ears from said stalks, a hopper in the upper portion of the frame, the bottom of said hopper provided with an opening forming a passage leading to the husking-rolls, band-severing mechanism consisting of a circular saw located at the inner end of the passage and above the husking-rolls, and means for rotating said band-severing mechanism in a direction toward the outer end of the passage.

5. The combination of a frame, rotatable husking-rolls arranged therein and extending from the front toward the rear of the machine and adapted to grasp and carry the cornstalks therebetween and snap the ears from said stalks, a hopper in the upper portion of the frame, the bottom of said hopper provided with an opening forming a passage leading to the husking-rolls, band-severing mechanisms rotatable together and located at the inner end of the passage and above the husking-rolls, and consisting of a plurality of circular saws, and means for rotating said band-severing mechanisms in a direction toward the outer end of the passage.

6. The combination of a frame, rotatable husking-rolls arranged therein and extending from the front toward the rear of the machine and adapted to grasp and carry the cornstalks therebetween, a hopper in the upper portion of the frame, the bottom of said hopper provided with an opening forming a passage leading to the husking-rolls, band-severing mechanisms rotatable together and located at the inner end of the passage and above the husking-rolls, an inwardly-inclined board at the outer end of the passage, and means for rotating the severing mechanisms toward the inclined board.

7. The combination of a frame, rotatable husking-rolls arranged therein and extending from the front toward the rear of the machine, a hopper in the upper portion of the frame, the front edge of the bottom of said hopper terminating short of the forward end of the machine and forming a passage or opening in advance of its forward edge, and said forward edge being slitted, a board depending for a desired distance from the forward edge of the bottom of the hopper, said board being slitted, band-severing mechanism located at the inner end of the passage and above the husking-rolls and rotatable in the slitted portions of the bottom of the hopper and the depending board, and means for rotating said severing mechanism in a direction toward the outer end of the passage.

8. The combination with a hopper provided with a flaring top opening, of wings hinged at the opposite top edges of the flaring opening, a bar pivoted to and depending from each wing, bracket-arms extending from the hopper, and means for causing said bracket-arms to engage with the pivoted bars at different points on said pivoted bars whereby the wings may be supported in different positions.

9. The combination with a hopper provided with a flaring top opening, of wings hinged at the upper edges of the flaring opening, a bar pivoted to and depending from the under side of each wing, said bar provided with a series of perforations, horizontal bracket-arms, each provided with an eye through which the bar passes, and a pin for each bar adapted to pass through any of the perforations of the bar and to rest on the top of the horizontal bracket-arm, to thereby support the wing in adjusted position.

In testimony whereof I affix my signature in presence of two witnesses.

AUGUST ROSENTHAL.

Witnesses:
A. L. MORSELL,
ANNA F. SCHMIDTBAUER.